US012744319B2

(12) United States Patent
Chang et al.

(10) Patent No.: US 12,744,319 B2
(45) Date of Patent: Sep. 22, 2026

(54) ANTENNA STRUCTURE

(71) Applicant: Quanta Computer Inc., Taoyuan City (TW)

(72) Inventors: Kai-Hsiang Chang, Taoyuan City (TW); Chung-Ting Hung, Taoyuan City (TW); Chin-Lung Tsai, Taoyuan City (TW); Yi-Ling Tseng, Taoyuan City (TW); Yu-Chen Zhao, Taoyuan City (TW); Chun-I Cheng, Taoyuan City (TW)

(73) Assignee: QUANTA COMPUTER INC., Taoyuan City (TW)

( * ) Notice: Subject to any disclaimer, the term of this patent is extended or adjusted under 35 U.S.C. 154(b) by 79 days.

(21) Appl. No.: 18/923,203

(22) Filed: Oct. 22, 2024

(65) Prior Publication Data

US 2026/0066537 A1 Mar. 5, 2026

(30) Foreign Application Priority Data

Aug. 27, 2024 (TW) ................................ 113209250

(51) Int. Cl.
*H01Q 5/357* (2015.01)
*H01Q 1/24* (2006.01)
*H01Q 1/38* (2006.01)

(52) U.S. Cl.
CPC ............. *H01Q 5/357* (2015.01); *H01Q 1/243* (2013.01); *H01Q 1/38* (2013.01)

(58) Field of Classification Search
None
See application file for complete search history.

(56) References Cited

U.S. PATENT DOCUMENTS

2019/0198975 A1* 6/2019 Chen ......................... H01Q 9/42
2020/0168993 A1* 5/2020 Wei .......................... H01Q 1/24
2021/0249776 A1* 8/2021 Wei ......................... H01Q 5/328
2024/0088562 A1* 3/2024 Su ........................... H01Q 5/328

FOREIGN PATENT DOCUMENTS

CN 118174009 A * 6/2024 ............. H01Q 5/307

* cited by examiner

*Primary Examiner* — Dameon E Levi
*Assistant Examiner* — Anh Ho
(74) *Attorney, Agent, or Firm* — McClure, Qualey & Rodack, LLP

(57) ABSTRACT

An antenna structure includes a feeding radiation element, a first radiation element, a second radiation element, a third radiation element, a fourth radiation element, a fifth radiation element, and a sixth radiation element. The first radiation element is coupled to the feeding radiation element. The second radiation element is coupled to the feeding radiation element. The first radiation element and the second radiation element substantially extend in opposite directions. The third radiation element is coupled to a first grounding point. The fourth radiation element is coupled to the third radiation element. Both the third radiation element and the fourth radiation element are adjacent to the second radiation element. The fifth radiation element is coupled to a second grounding point. The fifth radiation element is adjacent to the first radiation element. The sixth radiation element is coupled to a third grounding point.

9 Claims, 2 Drawing Sheets

ANTENNA STRUCTURE

CROSS REFERENCE TO RELATED APPLICATIONS

This application claims priority of Taiwan Patent Application No. 113209250 filed on Aug. 27, 2024, the entirety of which is incorporated by reference herein.

BACKGROUND OF THE INVENTION

Field of the Invention

The disclosure generally relates to an antenna structure, and more particularly, to a wideband antenna structure.

Description of the Related Art

With the advancements being made in mobile communication technology, mobile devices such as portable computers, mobile phones, multimedia players, and other hybrid functional portable electronic devices have become more common. To satisfy consumer demand, mobile devices can usually perform wireless communication functions. Some devices cover a large wireless communication area; these include mobile phones using 2G, 3G, and LTE (Long Term Evolution) systems and using frequency bands of 700 MHz, 850 MHz, 900 MHz, 1800 MHz, 1900 MHz, 2100 MHz, 2300 MHz, and 2500 MHz. Some devices cover a small wireless communication area; these include mobile phones using Wi-Fi systems and using frequency bands of 2.4 GHz, 5.2 GHz, and 5.8 GHz.

Antennas are indispensable elements for wireless communication. If an antenna for signal reception and transmission has an insufficient operational bandwidth, it may degrade the communication quality of the relative mobile device. Accordingly, it has become a critical challenge for designers to design a small-size, wideband antenna structure.

BRIEF SUMMARY OF THE INVENTION

In an exemplary embodiment, the invention is directed to an antenna structure that includes a feeding radiation element, a first radiation element, a second radiation element, a third radiation element, a fourth radiation element, a fifth radiation element, a sixth radiation element, and a carrier element. The feeding radiation element has a feeding point. The first radiation element is coupled to the feeding radiation element. The second radiation element is coupled to the feeding radiation element. The first radiation element and the second radiation element substantially extend in opposite directions. The third radiation element is coupled to a first grounding point. The fourth radiation element is coupled to the third radiation element. Both the third radiation element and the fourth radiation element are adjacent to the second radiation element. The fifth radiation element is coupled to a second grounding point. The fifth radiation element is adjacent to the first radiation element. The sixth radiation element is coupled to a third grounding point. The sixth radiation element is disposed opposite to the third radiation element. The feeding radiation element, the first radiation element, the second radiation element, the third radiation element, the fourth radiation element, the fifth radiation element, and the sixth radiation element are all disposed on the carrier element.

In some embodiments, the first radiation element includes a first terminal widening portion, and the sixth radiation element includes a second terminal widening portion.

In some embodiments, the fifth radiation element includes a shorting portion, a central portion, a first extension portion, a second extension portion, a third extension portion, and a fourth extension portion. The central portion is coupled through the shorting portion to the second grounding point. The first extension portion, the second extension portion, the third extension portion, and the fourth extension portion are coupled to the central portion.

In some embodiments, a first coupling gap is formed between the second radiation element and the third radiation element. A second coupling gap is formed between the second radiation element and the fourth radiation element. A third coupling gap is formed between the first radiation element and the fifth radiation element. The width of each of the coupling gaps (i.e., the first coupling gap, the second coupling gap, and the third coupling gap) is shorter than or equal to 1 mm.

In some embodiments, the distance between the third radiation element and the sixth radiation element is from 8 mm to 10 mm.

In some embodiments, the antenna structure covers a first frequency band, a second frequency band, and a third frequency band. The first frequency band is from 791 MHz to 862 MHz. The second frequency band is from 1710 MHz to 2170 MHz. The third frequency band is from 2500 MHz to 2690 MHz.

In some embodiments, the total length of the feeding radiation element and the first radiation element is substantially equal to 0.25 wavelength of the second frequency band.

In some embodiments, the total length of the feeding radiation element and the second radiation element is substantially equal to 0.25 wavelength of the third frequency band.

In some embodiments, the length of each of the third radiation element and the fourth radiation element is substantially equal to 0.25 wavelength of the second frequency band.

In some embodiments, the length of the sixth radiation element is substantially equal to 0.25 wavelength of the third frequency band.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

Figure 1:
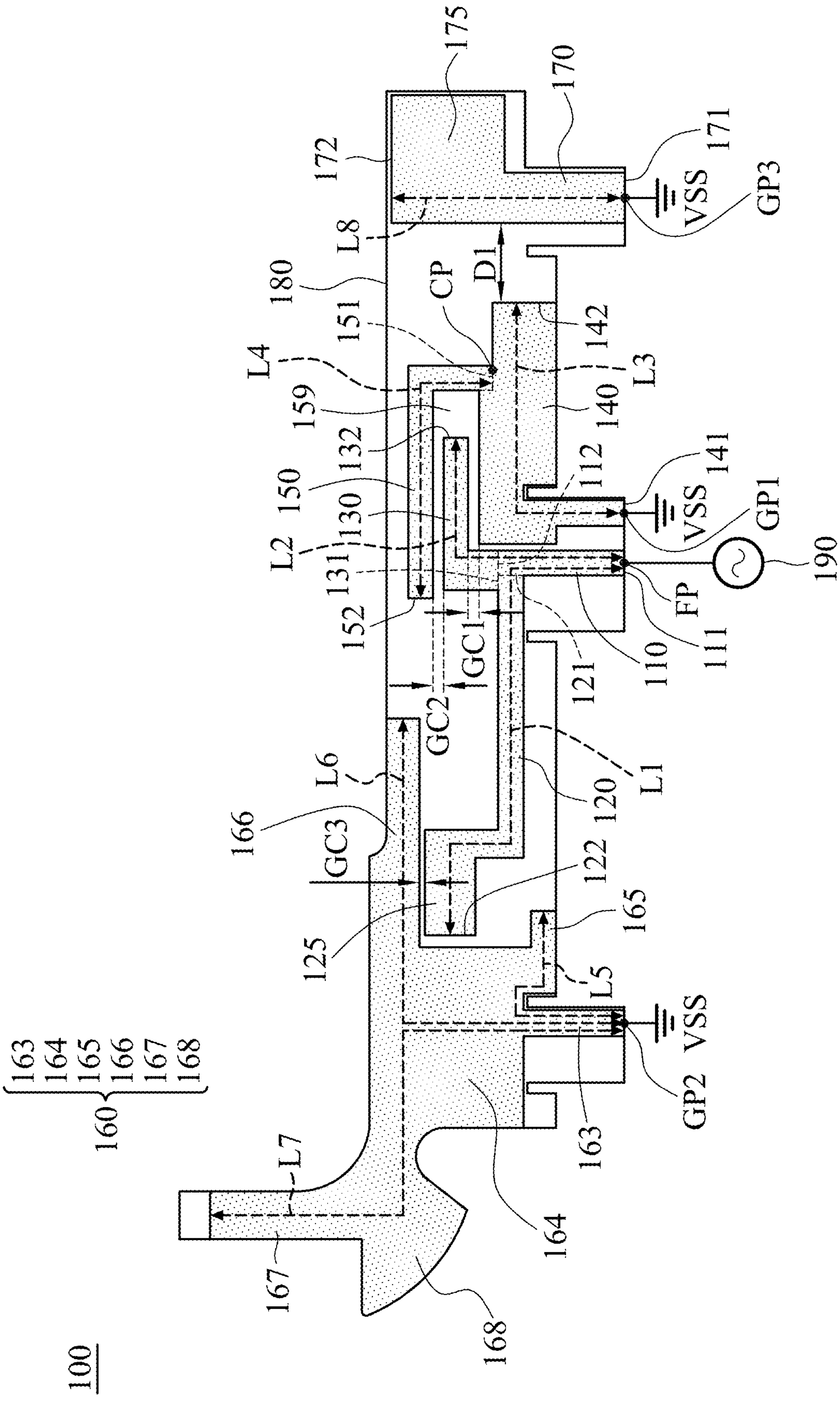
FIG. 1 is a diagram of an antenna structure according to an embodiment of the invention.

In order to illustrate the purposes, features and advantages of the invention, the embodiments and figures of the invention are shown in detail as follows.

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". The term "substantially" means the value is within an acceptable error range. One skilled in the art can solve the technical problem within a predetermined error range and achieve the proposed technical performance. Also, the term "couple" is intended to mean either an indirect or direct electrical connection. Accordingly, if one device is coupled to another device, that connection may be through a direct electrical connection, or through an indirect electrical connection via other devices and connections.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Furthermore, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

FIG. 1 is a diagram of an antenna structure 100 according to an embodiment of the invention. The antenna structure 100 may be applied to a mobile device, such as a smart phone, a tablet computer, a notebook computer, a wireless access point, a router, or any device with a communication function. Alternatively, the antenna structure 100 may be applied to an electronic device, such as any unit of IOT (Internet of Things).

In the embodiment of FIG. 1, the antenna structure 100 includes a feeding radiation element 110, a first radiation element 120, a second radiation element 130, a third radiation element 140, a fourth radiation element 150, a fifth radiation element 160, a sixth radiation element 170, and a carrier element 180. The feeding radiation element 110, the first radiation element 120, the second radiation element 130, the third radiation element 140, the fourth radiation element 150, the fifth radiation element 160, and the sixth radiation element 170 may all be made of metal materials, such as copper, silver, aluminum, iron, or their alloys.

The feeding radiation element 110 may substantially have a straight-line shape. Specifically, the feeding radiation element 110 has a first end 111 and a second end 112. A feeding point FP is substantially positioned at the first end 111 of the feeding radiation element 110. The feeding point FP may be further coupled to a signal source 190. For example, the signal source 190 may be an RF (Radio Frequency) module for exciting the antenna structure 100.

The first radiation element 120 may substantially have a Z-shape. Specifically, the first radiation element 120 has a first end 121 and a second end 122. The first end 121 of the first radiation element 120 is coupled to the second end 112 of the feeding radiation element 110. The second end 122 of the first radiation element 120 is an open end. In some embodiments, the first radiation element 120 includes a first terminal widening portion 125 positioned at the second end 122. For example, the first terminal widening portion 125 of the first radiation element 120 may substantially have a rectangular shape.

The second radiation element 130 may substantially have an L-shape. Specifically, the second radiation element 130 has a first end 131 and a second end 132. The first end 131 of the second radiation element 130 is coupled to the second end 112 of the feeding radiation element 110. The second end 132 of the second radiation element 130 is an open end. For example, the second end 122 of the first radiation element 120 and the second end 132 of the second radiation element 130 may substantially extend in opposite directions and away from each other. In some embodiments, the combination of the feeding radiation element 110, the first radiation element 120, and the second radiation element 130 substantially has a T-shape.

The third radiation element 140 may substantially have a variable-width L-shape. Specifically, the third radiation element 140 has a first end 141 and a second end 142. The first end 141 of the third radiation element 140 is coupled to a first grounding point GP1. The second end 142 of the third radiation element 140 is an open end. For example, the second end 132 of the second radiation element 130 and the second end 142 of the third radiation element 140 may substantially extend in the same direction. In addition, the first grounding point GP1 may be further coupled to a ground voltage VSS. The ground voltage VSS may be provided by a system ground plane (not shown). In some embodiments, the third radiation element 140 is adjacent to the second radiation element 130. A first coupling gap GC1 may be formed between the second radiation element 130 and the third radiation element 140. It should be noted that the term "adjacent" or "close" over the disclosure means that the spacing of (i.e., the distance between) two corresponding elements is smaller than a predetermined distance (e.g., 10 mm or the shorter), but often does not mean that the two corresponding elements directly touch each other (i.e., the aforementioned distance/space between them is reduced to 0).

The fourth radiation element 150 may substantially have an inverted L-shape. Specifically, the fourth radiation element 150 has a first end 151 and a second end 152. The first end 151 of the fourth radiation element 150 is coupled to a connection point CP on the third radiation element 140. The second end 152 of the fourth radiation element 150 is an open end. For example, the second end 132 of the second radiation element 130 and the second end 152 of the fourth radiation element 150 may substantially extend in opposite directions and away from each other. In some embodiments, a notch region 159 is defined by the third radiation element 140 and the fourth radiation element 150, and the second end 132 of the second radiation element 130 also extends into the notch region 159. In some embodiments, the fourth radiation element 150 is adjacent to the second radiation element 130. A second coupling gap GC2 may be formed between the second radiation element 130 and the fourth radiation element 150.

The fifth radiation element 160 may substantially have an irregular shape. Specifically, the fifth radiation element 160 includes a shorting portion 163, a central portion 164, a first extension portion 165, a second extension portion 166, a third extension portion 167, and a fourth extension portion 168. In the fifth radiation element 160, the central portion 164 is coupled through the shorting portion 163 to a second grounding point GP2. Furthermore, the first extension portion 165, the second extension portion 166, the third extension portion 167, and the fourth extension portion 168 are coupled to different positions on the central portion 164. The second grounding point GP2 may be further coupled to the ground voltage VSS. The second grounding point GP2 may be different from the first grounding point GP1 as mentioned above. For example, each of the first extension portion 165, the second extension portion 166, the third extension portion 167 of the fifth radiation element 160 may substantially have a variable-width straight-line shape, and the fourth extension portion 168 of the fifth radiation element 160 may substantially have a tapered shape, but they are not limited thereto. In some embodiments, the second extension portion 166 of the fifth radiation element 160 is adjacent to the first terminal widening portion 125 of the first radiation element 120. Thus, a third coupling gap GC3 may be formed between the first radiation element 120 and the fifth radiation element 160.

The sixth radiation element 170 may substantially have another variable-width straight-line shape, which may be disposed opposite to the third radiation element 140 and may be separate from the third radiation element 140. Specifically, the sixth radiation element 170 has a first end 171 and a second end 172. The first end 171 of the sixth radiation element 170 is coupled to a third grounding point GP3. The second end 172 of the sixth radiation element 170 is an open end. The third grounding point GP3 may be further coupled to the ground voltage VSS. The third grounding point GP3 may be different from the first grounding point GP1 and the second grounding point GP2 as mentioned above. In some embodiments, the sixth radiation element 170 includes a second terminal widening portion 175 positioned at the second end 172. For example, the second terminal widening portion 175 of the sixth radiation element 170 may substantially have a square shape.

The feeding radiation element 110, the first radiation element 120, the second radiation element 130, the third radiation element 140, the fourth radiation element 150, the fifth radiation element 160, and the sixth radiation element 170 may all be disposed on the same surface of the carrier element 180. The shape and type of the carrier element 180 are not limited in the invention. For example, the carrier element 180 may be an FR4 (Flame Retardant 4) substrate, a PCB (Printed Circuit Board), or an FPC (Flexible Printed Circuit). In some embodiments, the antenna structure 100 is a planar antenna structure. However, the invention is not limited thereto. In alternative embodiments, the carrier element 180 has a curved surface, such that the antenna structure 100 is a 3D (Three-Dimensional) antenna structure.

Figure 2:
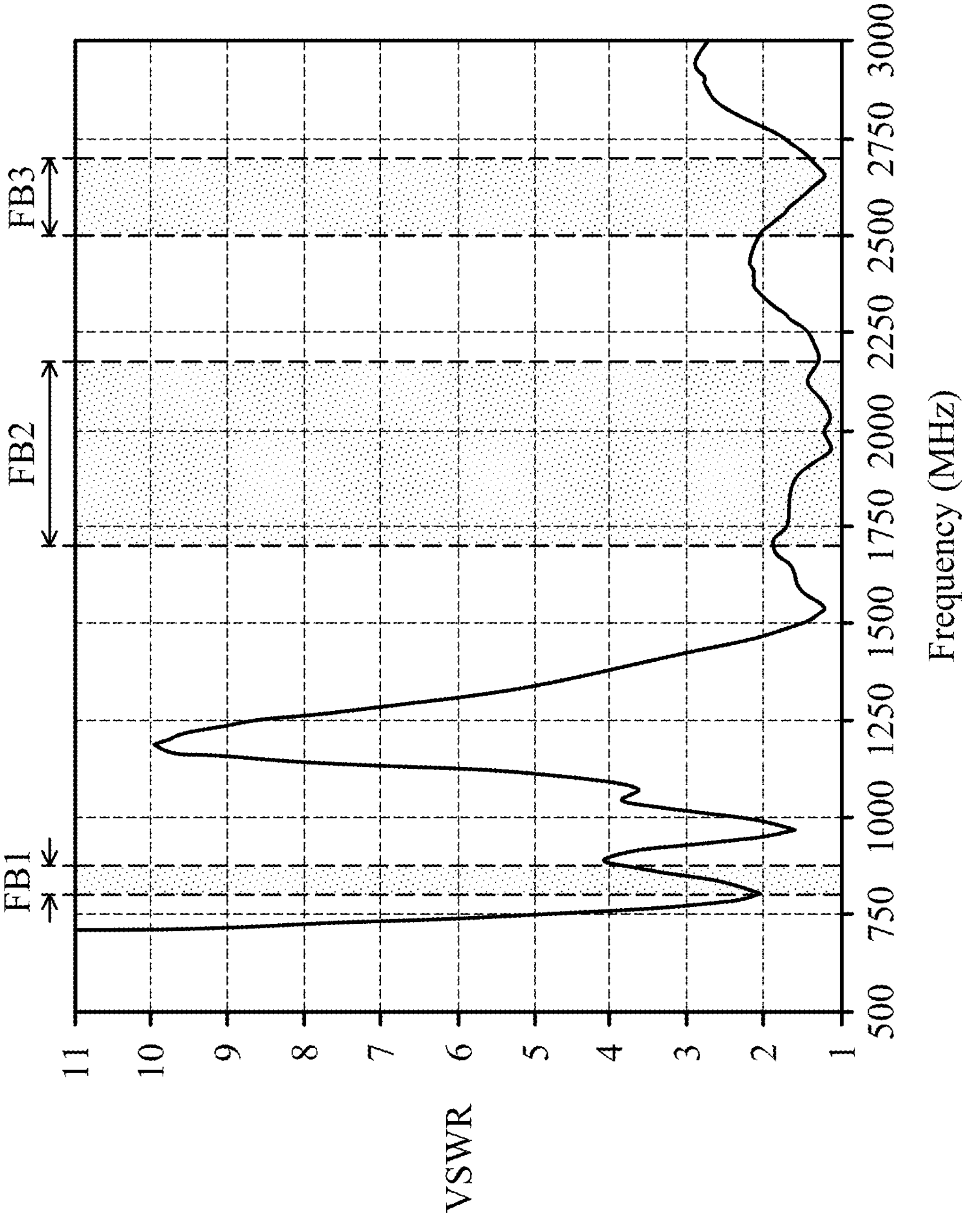
FIG. 2 is a diagram of VSWR (Voltage Standing Wave Ratio) of an antenna structure according to an embodiment of the invention.

FIG. 2 is a diagram of VSWR (Voltage Standing Wave Ratio) of the antenna structure 100 according to an embodiment of the invention. The horizontal axis represents the operational frequency (MHz), and the vertical axis represents the VSWR. According to the measurement of FIG. 2, the antenna structure 100 can cover a first frequency band FB1, a second frequency band FB2, and a third frequency band FB3. For example, the first frequency band FB1 may be from 791 MHz to 862 MHz, the second frequency band FB2 may be from 1710 MHz to 2170 MHz, and the third frequency band FB3 may be from 2500 MHz to 2690 MHz. Therefore, the antenna structure 100 can support at least the wideband operations of LTE (Long Term Evolution).

In some embodiments, the operational principles of the antenna structure 100 will be described as follows. The fifth radiation element 160 is excited to generate the first frequency band FB1. The feeding radiation element 110, the first radiation element 120, the third radiation element 140, and the fourth radiation element 150 are excited to generate the second frequency band FB2. The feeding radiation element 110, the second radiation element 130, the fifth radiation element 160, and the sixth radiation element 170 are excited to generate the third frequency band FB3.

In some embodiments, the element sizes of the antenna structure 100 will be described as follows. The total length L1 of the feeding radiation element 110 and the first radiation element 120 may be substantially equal to 0.25 wavelength (λ/4) of the second frequency band FB2 of the antenna structure 100. The total length L2 of the feeding radiation element 110 and the second radiation element 130 may be substantially equal to 0.25 wavelength (λ/4) of the third frequency band FB3 of the antenna structure 100. The length L3 of the third radiation element 140 may be substantially equal to 0.25 wavelength (λ/4) of the second frequency band FB2 of the antenna structure 100. The length L4 of the fourth radiation element 150 may be substantially equal to 0.25 wavelength (λ/4) of the second frequency band FB2 of the antenna structure 100. The total length L5 of the shorting portion 163 and the first extension portion 165 of the fifth radiation element 160 may be substantially equal to 0.25 wavelength (λ/4) of the third frequency band FB3 of the antenna structure 100. The total length L6 of the shorting portion 163, the central portion 164, and the second extension portion 166 of the fifth radiation element 160 may be substantially equal to 0.125 wavelength (λ/8) of the first frequency band FB1 of the antenna structure 100. The total length L7 of the shorting portion 163, the central portion 164, and the third extension portion 167 of the fifth radiation element 160 may be substantially equal to 0.125 wavelength (λ/8) of the first frequency band FB1 of the antenna structure 100. The length L8 of the sixth radiation element 170 may be substantially equal to 0.25 wavelength (λ/4) of the third frequency band FB3 of the antenna structure 100. The width of each of the coupling gaps (i.e., the first coupling gap GC1, the second coupling gap GC2, and the third coupling gap GC3) may be shorter than or equal to 1 mm. For example, the width of the first coupling gap GC1 may be from 0.5 mm to 0.9 mm, the width of the second coupling gap GC2 may be from 0.5 mm to 1 mm, and the width of the third coupling gap GC3 may be from 0.3 mm to 0.5 mm. The distance D1 between the third radiation element 140 and the sixth radiation element 170 may be from 8 mm to 10 mm. The above ranges of element sizes are calculated and obtained according to many experimental results, and they help to optimize the operational bandwidth and the impedance matching of the antenna structure 100.

In some embodiments, the first grounding point GP1 is coupled to the ground voltage VSS, the second grounding point GP2 is coupled to a first SAR (Specific Absorption Rate) sensor (not shown), and the second grounding point GP3 is coupled to a second SAR sensor (not shown). Since each SAR sensor is considered as a respective RF grounding point, the antenna structure 100 can support the dual functions of wireless communication and SAR detection, without additionally increasing the overall size.

The invention proposes a novel antenna structure. In comparison to the conventional design, the invention has at least the advantages of small size, wide bandwidth, and low manufacturing cost. Therefore, the invention is suitable for application in a variety of mobile communication devices or the IOT.

Note that the above element sizes, element shapes, and frequency ranges are not limitations of the invention. An antenna designer can fine-tune these settings or values to meet different requirements. It should be understood that the antenna structure of the invention is not limited to the configurations of FIGS. 1 and 2. The invention may merely include any one or more features of any one or more embodiments of FIGS. 1 and 2. In other words, not all of the features displayed in the figures should be implemented in the antenna structure of the invention.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An antenna structure, comprising:

a feeding radiation element, having a feeding point;

a first radiation element, coupled to the feeding radiation element;

a second radiation element, coupled to the feeding radiation element, wherein the first radiation element and the second radiation element substantially extend in opposite directions;

a third radiation element, coupled to a first grounding point;

a fourth radiation element, coupled to the third radiation element, wherein the third radiation element and the fourth radiation element are adjacent to the second radiation element;

a fifth radiation element, coupled to a second grounding point, wherein the fifth radiation element is adjacent to the first radiation element;

a sixth radiation element, coupled to a third grounding point, wherein the sixth radiation element is disposed opposite to the third radiation element; and a carrier element, wherein the feeding radiation element, the first radiation element, the second radiation element, the third radiation element, the fourth radiation element, the fifth radiation element, and the sixth radiation element are disposed on the carrier element;

wherein the fifth radiation element with an irregular shape comprises a shorting portion, a central portion, a first extension portion, a second extension portion, a third extension portion, and a fourth extension portion, the central portion is coupled through the shorting portion to the second grounding point, and the first extension portion, the second extension portion, the third extension portion and the fourth extension portion are coupled to the central portion.

2. The antenna structure as claimed in claim 1, wherein the first radiation element comprises a first terminal widening portion, and the sixth radiation element comprises a second terminal widening portion.

3. The antenna structure as claimed in claim 1, wherein a first coupling gap is formed between the second radiation element and the third radiation element, a second coupling gap is formed between the second radiation element and the fourth radiation element, a third coupling gap is formed between the first radiation element and the fifth radiation element, and a width of each of the first coupling gap, the second coupling gap and the third coupling gap is shorter than or equal to 1 mm.

4. The antenna structure as claimed in claim 1, wherein a distance between the third radiation element and the sixth radiation element is from 8 mm to 10 mm.

5. The antenna structure as claimed in claim 1, wherein the antenna structure covers a first frequency band, a second frequency band and a third frequency band, the first frequency band is from 791 MHz to 862 MHz, the second frequency band is from 1710 MHz to 2170 MHz, and the third frequency band is from 2500 MHz to 2690 MHz.

6. The antenna structure as claimed in claim 5, wherein a total length of the feeding radiation element and the first radiation element is substantially equal to 0.25 wavelength of the second frequency band.

7. The antenna structure as claimed in claim 5, wherein a total length of the feeding radiation element and the second radiation element is substantially equal to 0.25 wavelength of the third frequency band.

8. The antenna structure as claimed in claim 5, wherein a length of each of the third radiation element and the fourth radiation element is substantially equal to 0.25 wavelength of the second frequency band.

9. The antenna structure as claimed in claim 5, wherein a length of the sixth radiation element is substantially equal to 0.25 wavelength of the third frequency band.

* * * * *